United States Patent [19]

Braun et al.

[11] 3,955,666
[45] May 11, 1976

[54] SINGLE-CHAIN SCRAPER CONVEYOR

[75] Inventors: Ernst Braun; Gert Braun, both of Essen-Heisingen, Germany

[73] Assignee: Halbach and Braun, Germany

[22] Filed: Oct. 3, 1974

[21] Appl. No.: 511,697

[30] Foreign Application Priority Data
Oct. 23, 1973 Germany............................ 2353005

[52] U.S. Cl................................ 198/168; 198/176
[51] Int. Cl.².................................... B65G 19/00
[58] Field of Search............ 198/168, 169, 170, 171, 198/172, 173, 174, 176, 189

[56] References Cited
UNITED STATES PATENTS
2,672,971  3/1954  Joy....................................... 198/171
3,269,526  8/1966  Imse et al............................. 198/189

FOREIGN PATENTS OR APPLICATIONS
688,748  3/1953  United Kingdom................. 198/171

*Primary Examiner*—John J. Love
*Assistant Examiner*—Douglas D. Watts
*Attorney, Agent, or Firm*—McGlew and Tuttle

[57] ABSTRACT

A single-chain conveyor comprises a chain which runs centrally on the bottom of a conveyor trough and which has pushers which are secured to the chain by over-chain brackets which are guided along the trough bottom. The underside of the chain brackets are provided with slide surfaces which are made of a plastic material to facilitate the gliding movement of the brackets over the bottom of the trough. Pusher arms are also advantageously provided with slide surfaces made of plastic which engage in angle-profiled guide surfaces of the side walls of the conveyor trough.

7 Claims, 3 Drawing Figures

SINGLE-CHAIN SCRAPER CONVEYOR

FIELD AND BACKGROUND OF THE INVENTION

This invention relates in general to the construction of conveyors and, in particular, to a new and useful chain conveyor which has pushers which are engaged over the chain on chain brackets which have slide surfaces on their underside to facilitate their sliding movement over the conveyor trough bottom.

DESCRIPTION OF THE PRIOR ART

Single-chain conveyors of various design are known. In particular, single-chain conveyors are known which comprise a single chain running centrally on the bottom of a conveying trough and which have pushers which are attached to the chain by means of chain brackets. The pushers have arms guided by means of guide shoes in lateral angle profiles or guide faces of the conveying trough. Such single-chain conveyors have proved useful and reliable, particularly as to their conveying capacity, but they may be improved in other aspects. It has been found that the pushers sliding along the bottom of the trough and in the lateral angle profiles are exposed to considerable wear and must therefore be frequently replaced. In addition, particularly if the chain conveyor runs empty, the pushers are dragged along so that they effect schreeching noises which are extremely annoying. Such noises, however, are environmentally intolerable and they are badly disturbing even in underground operations in which the noise becomes intense.

SUMMARY OF THE INVENTION

The present invention provides a single-chain conveyor in which the circulating chain brackets and pushers are silent in operation and they may operate substantially without wear. The invention provides a single-chain conveyor which comprises a chain which runs centrally on the bottom of a conveying trough and which includes pushers which are secured thereto by means of chain brackets and which have arms which are guided at their ends in inwardly tapered guide faces of the side walls. In accordance with the invention, a slide surface of plastic is formed at the bottom of the chain brackets so that it rides in contact on the trough bottom. The construction permits the pushers to be guided silently over the trough bottom and their end guide faces are provided with slide surfaces of plastic so that they also can bear smoothly on the profiled side walls of the conveyor trough. With the slide surfaces of plastic on both the chain bracket and the pusher arm ends, there is little danger of annoyance by screeching noises.

By making the glide surface of the chain bracket and also the guide surfaces on each end of the pusher arms of plastic, it is ensured that even if the pusher arms get into a position which is inclined relative to the trough bottom, they will continue to run on the slide surfaces of plastic and they can neither be worn down nor cause disturbing screeching noises. This applies particularly to the zone of the guide shoes which are guided in the lateral angle profiles on the side walls of the conveyor trough.

The slide surfaces of plastic are advantageously designed as a plastic coating of the bracket webs and/or the guide webs. In a preferred arrangement, the slide surface of plastic comprises a plastic strip which is inserted into the bracket bottom wall and projects toward the trough bottom. Such a plastic strip can be easily replaced after it has been worn down and they are advantageously inserted in a dove-tailed groove of the bracket which extends transversely to the conveying direction.

The pusher arms include slide surfaces of plastic which form the outer surfaces of the guide shoes which engage in the angled receiving grooves of the side walls of the conveyor trough. The plastic advantageously comprises caps which are replaceable and which are detachably secured in the guide shoe ends of the arms of the pusher. In the preferred form, the inserts comprise end pieces having a tongue and groove fit with the arms and which are held in place by a clamping sleeve or pin which extends through a projecting tongue of the arm of the pusher. The caps of plastic may also comprise slide beads which project from the underside of the pusher arms toward the trough bottom and which advantageously extend in the conveying direction. By such a construction, if there is a tilting toward the trough bottom of the pusher arms, the projecting portion of the insert or the caps will apply against the respective guide surface.

The advantages obtained with the invention are to be seen substantially in the provision of a single-chain conveyor in which the chain brackets and the pushers are guided in a particularly wear-free manner on slide surfaces of plastic and which circulate very silently. As a result, the service life is extended in a surprisingly simple manner and any screeching noises which tend to occur particularly if the conveyor ran empty, are avoided. The conveyor thus comprises a structure which is environmentally compatible.

Accordingly, it is an object of the invention to provide a single-chain conveyor which includes a chain running in a conveyor trough which has angled side wall guide surfaces and which includes one or more pushers which are mounted over chain brackets on the chain and, wherein the brackets have a bottom glide surface which is adapted to engage the trough bottom made of a plastic material and wherein also the pusher arms are advantageously provided with guide shoes with plastic material inserts which engage in the side wall guide faces.

A further object of the invention is to provide a single-chain conveyor construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

DESCRIPTION OF THE PREFERRED EMBODIMENT

Figure 1:
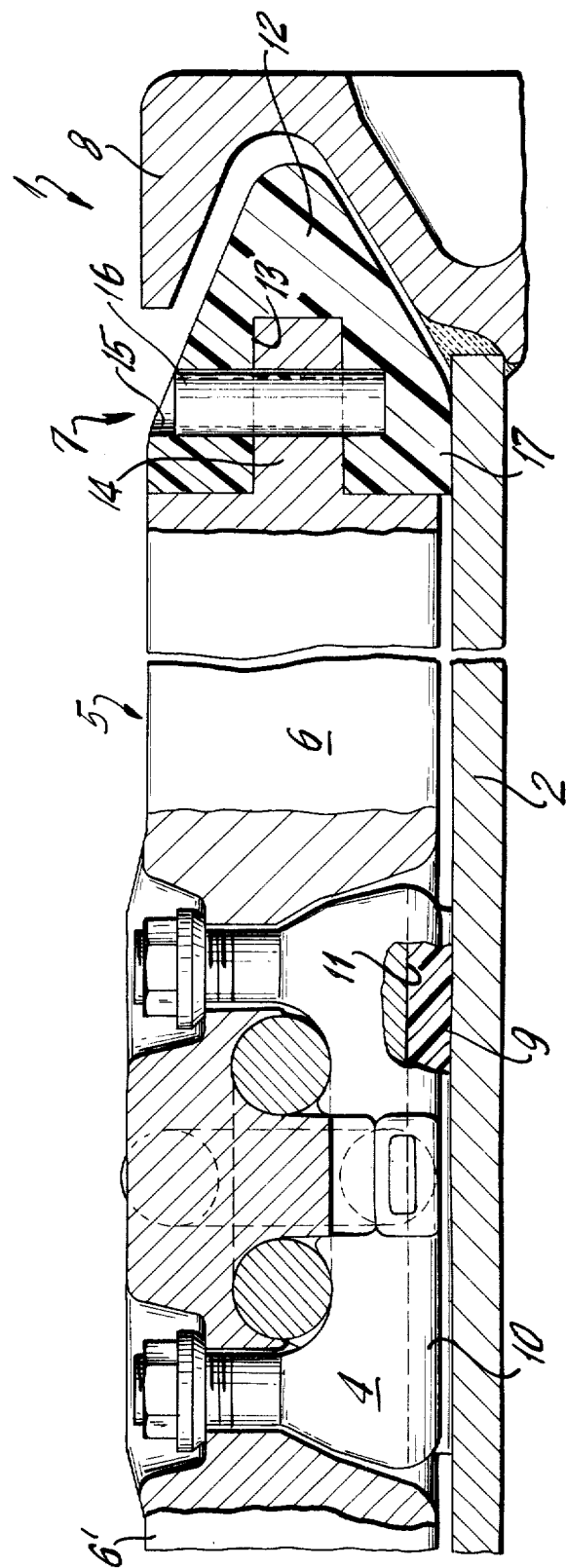
FIG. 1 is a partial vertical section view of a single-chain conveyor constructed in accordance with the invention.
Figure 2:
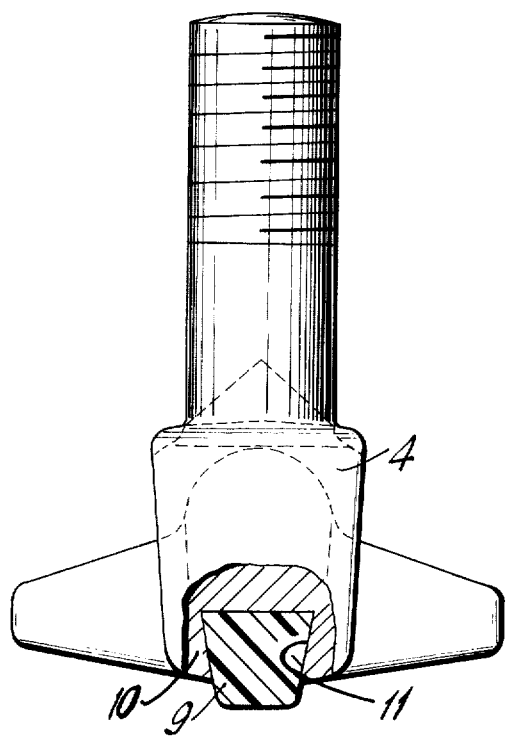
FIG. 2 is a partial longitudinal sectional view and a side elevational view of the chain bracket.
Figure 3:
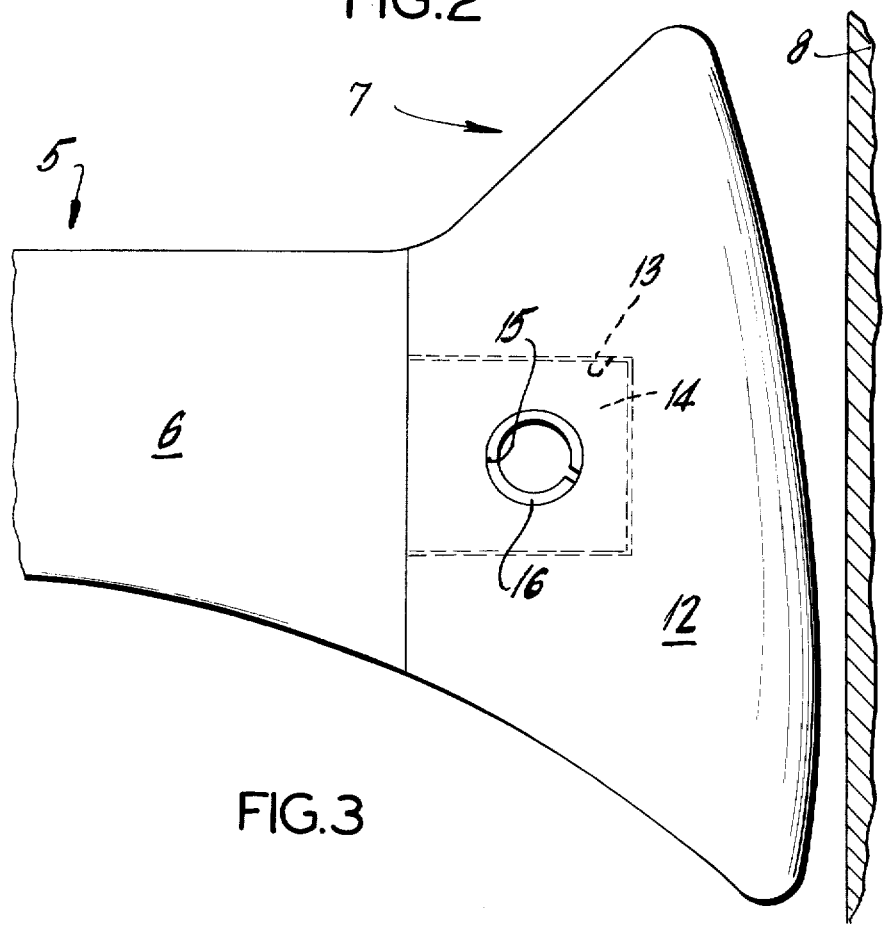
FIG. 3 is a partial top plan view of one of the pusher arms shown in FIG. 1.

Referring to the drawings in particular, the invention embodied therein, comprises a single-chain conveyor which includes a chain which runs centrally on the bottom 2 of a conveying trough 1. Pushers, generally designated 5, are secured to the chain by means of chain brackets 4. The pushers have arms 6, 6' which are guided by means of guide shoes, generally designated 7, in lateral angle profiles or guide faces 8 of the conveying trough 1.

In accordance with the invention, chain brackets 4 comprise a glide or slide surface 9 of plastic which is provided on the underside of the bracket 4 and glides over the trough bottom 2. Slide surface 9, of plastic material, may be designed as a plastic coating of the bracket webs 10, but in the preferred form as shown, the slide surface comprises a plastic strip or insert 9 which is engaged in a dove-tail shaped groove 11 which extends transverse to the travel direction.

In accordance with a further feature of the invention, the pusher arms 6 and 6' have a slide surface or insert 12 which is made of plastic material and which cooperates with the trough bottom 2 and/or the lateral angled profiles or guide surfaces 8 of the conveying trough 1. The slide surface may comprise a plastic coating of the guide shoes, generally designated 7, but in accordance with the preferred arrangement shown, the slide surface comprises a cap of plastic which can be mounted in the guide shoes, and which is replaceable. The cap inserts 12 are detachably fixed to the guide shoes 7 by means of a tongue and groove joint which includes a tongue 14 on the shoes 6 and 6' which projects into a recess or groove 13 defined in the insert 12. The clamping bolt or pin 16 extends through a bore 15 of the insert 12 and through a receiving bore of the tongue 14. In the preferred construction, the inserts 12 are provided with slide beads or projections 17 of plastic which project below the surface of the pusher arms and advantageously engage with, or run along, the bottom 2. Such slide beads may be made integral with the inserts 12 and they extend, in accordance with the preferred embodiment, in a conveying direction.

While a specific embodiment of the invention has been shown and described in detail to illustrate the application of the principles of the invention, it will be understood that the invention may be embodied otherwise without departing from such principles.

What is claimed is:

1. A single-chain conveyor comprising a conveyor trough having a bottom with side walls having recessed guide faces, a chain running in said conveyor trough, a chain bracket connected to said chain and having a portion extending below said chain, a pusher connected to said chain over said bracket and having side arms engageable in respective side wall guide faces, said chain bracket having a plastic slide surface portion engageable over said bottom.

2. A single-chain conveyor, according to claim 1, wherein said slide surface portion of said bracket comprises a separate strip of plastic projecting from the bottom of said chain bracket.

3. A single-chain conveyor, according to claim 1, wherein said chain bracket comprises a metal member having a bottom wall with a transverse dove-tailed groove therein, said slide surface portion comprising an insert engaged in said dove-tailed groove.

4. A single-chain conveyor, according to claim 1, wherein said pusher arms include outer end surfaces forming guide shoes of plastic material.

5. A single-chain conveyor, according to claim 4, wherein said guide shoe of plastic material comprises a separate plastic member detachably engaged with the outer ends of each of said pusher arms and adapted to engage at least in the guide faces of said side walls.

6. A single-chain conveyor, according to claim 1, wherein said pusher arms include guide shoes comprising separate plastic inserts engageable in the guide faces of said side walls, each of said inserts having a receiving groove, said guide shoes having projecting tongues extending into said receiving grooves and a bolt extendng through said inserts and through said tongue.

7. A single-chain conveyor, according to claim 6, wherein said inserts include a projecting bead extending downwardly from the bottom of said insert and engageable with said trough bottom.

* * * * *